(12) United States Patent
Inaba et al.

(10) Patent No.: US 6,633,098 B2
(45) Date of Patent: Oct. 14, 2003

(54) ALTERNATOR FOR USE IN A VEHICLE

(75) Inventors: Toru Inaba, Chiyoda (JP); Hideaki Mori, Chiyoda (JP); Keizou Kawamura, Kasumigaura (JP); Susumu Sasaki, Naka (JP); Masami Takano, Hitachinaka (JP); Susumu Tajima, Hitachinaka (JP); Susumu Terumoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/054,879

(22) Filed: Jan. 25, 2002

(65) Prior Publication Data

US 2003/0042806 A1 Mar. 6, 2003

(30) Foreign Application Priority Data

Aug. 29, 2001 (JP) ........................................ 2001-259830

(51) Int. Cl.$^7$ ................................................. H02K 9/00

(52) U.S. Cl. ........................................... 310/58; 310/52

(58) Field of Search ............................... 310/52, 54, 58, 310/64

(56) References Cited

U.S. PATENT DOCUMENTS

| 4,111,615 | A | * | 9/1978 | Watanabe | 415/119 |
| 4,689,507 | A | * | 8/1987 | Baker et al. | 310/42 |
| 5,714,819 | A | * | 2/1998 | Gilliland et al. | 310/58 |
| 5,814,908 | A | * | 9/1998 | Muszynski | 310/58 |
| 5,977,668 | A | * | 11/1999 | Yoshioka | 310/263 |
| 6,169,344 | B1 | * | 1/2001 | Tsuruhara | 237/12.3 R |

FOREIGN PATENT DOCUMENTS

| JP | 7-194060 | 7/1995 |
| JP | 2000-83351 | 3/2000 |

* cited by examiner

Primary Examiner—Dang Le
Assistant Examiner—Nguyen Hanh
(74) Attorney, Agent, or Firm—Antonelli, Terry, Stout & Kraus, LLP

(57) ABSTRACT

An alternator for use in an automobile includes brackets for supporting a rotation shaft at both sides of a rotor, being thermally connected to a stator for supporting the stator, while one side of the rotor is closed by a bracket. A cooling water passage is provided in the bracket, a cooling fan is provided on the closed side of the rotor, and a cooling fin provided opposing to the cooling fan and in vicinity of the cooling water passage, thereby enabling cool down of the stator and the rotor, effectively, with low noises, and thereby obtaining a high power output.

12 Claims, 12 Drawing Sheets

ALTERNATOR FOR USE IN A VEHICLE

BACKGROUND OF THE INVENTION

1. Field of the Invention

The present invention relates to an alternator for use in a vehicle, and in particular relates to an alternator being suitable to be mounted on a vehicle, such as an automobile, etc.

2. Description of Prior Art

An A-C power generator for use in a vehicle, which is called by an alternator, is generally driven by an engine of the vehicle, such as, an internal combustion engine, for supplying electric power or energy for various automobile appliances within a car, and ordinarily, it is driven by means of a belt which is wound around a pulley attached onto a driving shaft of the internal combustion engine. Though a rotation speed of the internal combustion engine changes variously, conduction current flowing into an excitation coil is so adjusted that the voltage generated by the alternator comes to be constant, because of the necessity of a constant voltage of, such as 12V or the like, for example, which must be supplied to those automobile appliances. Current flows through the excitation coil, as well as, through a stator coil, a rectifier and a voltage regulator of the alternator for use in the vehicle, during electric power generation, and therefore it also causes heat generation therein, of course. Accordingly, it is necessary to cool down them compulsively, so as not to be overheated.

Conventionally, for the purpose of removing or taking away such the heat generated therein, an air outside is introduced into a room or space defined around a rotor by means of a cooling fan(s), which is/are provided at a front or/and rear of the rotor in the axial direction thereof, thereby achieving air-cooling thereof, however accompanying with an increase in the consumption of electric power by the automobile appliances for the vehicle, a further increase is demanded on a power output of the alternator for use in the vehicle, and it comes very difficult to obtain a cooling effect sufficiently, only by such means as the cooling fan(s) mentioned above. Also, since an amount of ventilation by the cooling fan(s) must be enlarged, in such the case of cooling by such the means of the cooling fan(s), large noises, which are caused by the fact that the cooling fan(s) rotates, leak out into an outside thereof. It is well known that the noises caused by such the wind power rise up in proportional to sixth power of the rotation speed. The noises caused by the cooling fan(s) rotating at high speed come to uncomfortable sound for the driver of an automobile.

Then, the alternator for use in a vehicle according to the conventional art comprises, as shown in Japanese Patent Laying-Open No. 2000-83351 (Conventional Art 1), for example: a rotation shaft onto which the rotational torque is transmitted from the engine of the vehicle through a pulley; a rotor being fixed onto the rotation shaft and exited by an excitation coil; a stator being provided outside an outer periphery of the rotor; a front bracket for supporting the stator in an axial direction of the rotor from a side of the pulley and for supporting the rotation shaft through a front shaft bearing, being formed with passages for cooling liquid or coolant therein; a rear bracket for supporting the stator from the side opposing the pulley and for supporting the rotation shaft through a rear shaft bearing, being formed with passages for the coolant therein; and a housing being formed with passages for the coolant, so as to connect between the passages for the coolant in the front bracket and the rear bracket. And, the housing is so provided that it encloses or cover all around the stator, and it has the passages formed, including an outward way located in an upper part and a return way located in a lower part, wherein each of the passages for coolant formed in the front bracket and the rear bracket has a diameter nearly equal to that of the passages of this housing, and is extended in a peripheral direction thereof. Also, the front and rear brackets are thermally connected to the rotor, the stator, the rectifier and the voltage regulator, etc., but being electrically insulated therebetween. Furthermore, the rotor is in the condition of being closed or shut off by the front and rear brackets at the both ends thereof. In this manner, the cooling capacity can be enlarged or enhanced by means of those passages for the coolant, which are provided in the brackets, and therefore it is possible to obtain a higher power output there from, comparing to the conventional structure having only the cooling fan(s), and to prevent the noises generated from the rotor side from leaking out into an outside, as well, because of the structure hermetically enclosing the rotor therein.

Also, the alternator for use in a vehicle according to the conventional art comprises a cooling structure of both air-cooling system and liquid-cooling system, as shown in Japanese Patent Laying-Open No. Hei 7-194060 (1995) (Conventional Art 2), for example, wherein the air-cooling system is built up with cooling fans, which are fixed on the front and rear surfaces of a pole core, and an air gap defined between an outer peripheral surface of the rotor and inner surfaces of the front and rear brackets, while the liquid-cooling system with a flow passage for use in cooling the rectifier, a flow passage for use in cooling the voltage regulator, a tube for use in cooling peripheral surfaces of the coil, and a tube for use in cooling rear surface of the coil, which are provided in parallel. And, in the air-cooling system by means of the cooling fans fixed on the front surface of the pole core, the cooling fan is rotated around, thereby sucking the air outside from an intake opening, so as to discharge it from an outlet opening after circulating the air within the gap. Also, in the air-cooling system by means of the cooling fans fixed on the rear surface of the pole core, the cooling fan is rotated around, thereby mixing and circulating the air within the gap in the encloses structure.

However, according to the conventional art 1, since the rotor must be constructed to be hermetically enclosed accompanying with the provision of the passages for coolant, it cannot be cooled down sufficiently, thereby bringing about an increase in temperature of the excitation coil thereof, and therefore a problem occurs that it is difficult to obtain a further increase in the power output of the alternator.

On the other hand, according to the conventional art 2, it is tried to enhance the cooling capacity of the rotor by means of the cooling fans, as well as, to conduct the cooling of the stator and the electric appliances (e.g. the rectifier, the voltage regulator, etc.) by the liquid-cooling, by combining the liquid-cooling system and the air-cooling system, however in the example of the air-cooling system by means of the cooling fan fixed on the front surface side of the pole core, since the fan builds up an open-type of sucking the air outside into, a problem occurs that the noises generated in the rotor side, including the cooling fan, leaks out into the outside thereof. While, in the example of the air-cooling system by means of the cooling fan fixed on the side of rear surface of the pole core, since the air is only mixed up and circulated within the gap of the hermetically closed structure, it is difficult to obtain sufficient cooling capacity, therefore bringing about a problem that it is difficult to obtain a further increase in the power output of the alternator.

Furthermore, due to the demand upon small-sizing of a car in recent years, the alternator for use in the vehicle is located, so that various parts or components come close to the surrounding of the place where it is installed, in various modes, thereby being extremely restricted in a space where the alternator can be installed. On the other hand, it is also necessary to improve mass-productivity thereof, by standardization of the alternator to be installed into various kinds of cars, as far as possible, however according to the conventional arts 1 and 2 mentioned above, sizes of the alternator for use in the vehicle as a whole, in particular, an outer diameter thereof comes to be large, since the passages for coolant are formed so as to enclose all around of the stator, therefore it is difficult to fit the alternator suitable for the restricted space where it should be installed into. Also, for the purpose of fitting to various kinds of cars, it is necessary to change over the housing and the front and rear brackets thereof, but it brings about a problem that the alternator is low in mass-productivity thereof.

SUMMARY OF THE INVENTION

A first object, according to the present invention, is to provide an alternator for use in an automobile, having low noises and enabling the stator and the rotor to be cooled down effectively, thereby obtaining a high output therefrom.

A second object, according to the present invention, is to provide an alternator for use in a vehicle, enabling the standardization to be fitted for various kinds of cars, as well as, being suitable for coping with restriction of the space where it is installed, thereby being superior in the mass-productivity.

For accomplishing the first object mentioned above, according to the present invention, there is provided an alternator for use in a vehicle, comprising: a stator having a stator core being formed in a cylindrical shape and a stator coil wound around said stator core; a rotor having pole cores and an excitation coil, being attached on a rotation shaft, so as to be located within said stator; brackets, being thermally connected to said stator for supporting said stator, for supporting said rotation shaft at both sides of said rotor, and being closed at one side of said rotor; cooling liquid passages provided in said brackets; a cooling fan provided at the closing side of said rotor; and a cooling fin provided in vicinity of said cooling passages, opposing to said cooling fan.

For accomplishing the second object mentioned above, according to the present invention, there is provided an alternator for use in a vehicle, comprising: a rotation shaft, on which rotating power is transmitted from an engine of a vehicle through a pulley; a rotor fixed on to said rotation shaft, to be excited by an excitation coil; a stator provided in an outer periphery of the rotor, being wound around with a stator coil; a front bracket for supporting the stator in a direction of said rotor shaft from a side of the pulley, and for supporting said rotation shaft through a shaft bearing; and a rear bracket for supporting said stator from an opposing side of said pulley, and for supporting said rotation shaft through a shaft bearing, wherein either one of said front bracket and said rear bracket comprises: a cooling liquid passage extending in a peripheral direction thereof; and conduction member attachment portions, being formed in condition of being closed at plural number of positions around an outer periphery portion thereof, locating in an outside of said cooling liquid passage.

BRIEF DESCRIPTION OF THE DRAWINGS

Those and other features, objects and advantages of the present invention will become more apparent from the following description when taken in conjunction with the accompanying drawings wherein:

FIG. 9 is a perspective view of a fin guide and a cooling fin, which are used in the same alternator for use in a vehicle, under the condition that they are combined with;

DETAILED DESCRIPTION OF PREFERRED EMBODIMENTS

Figure 1:
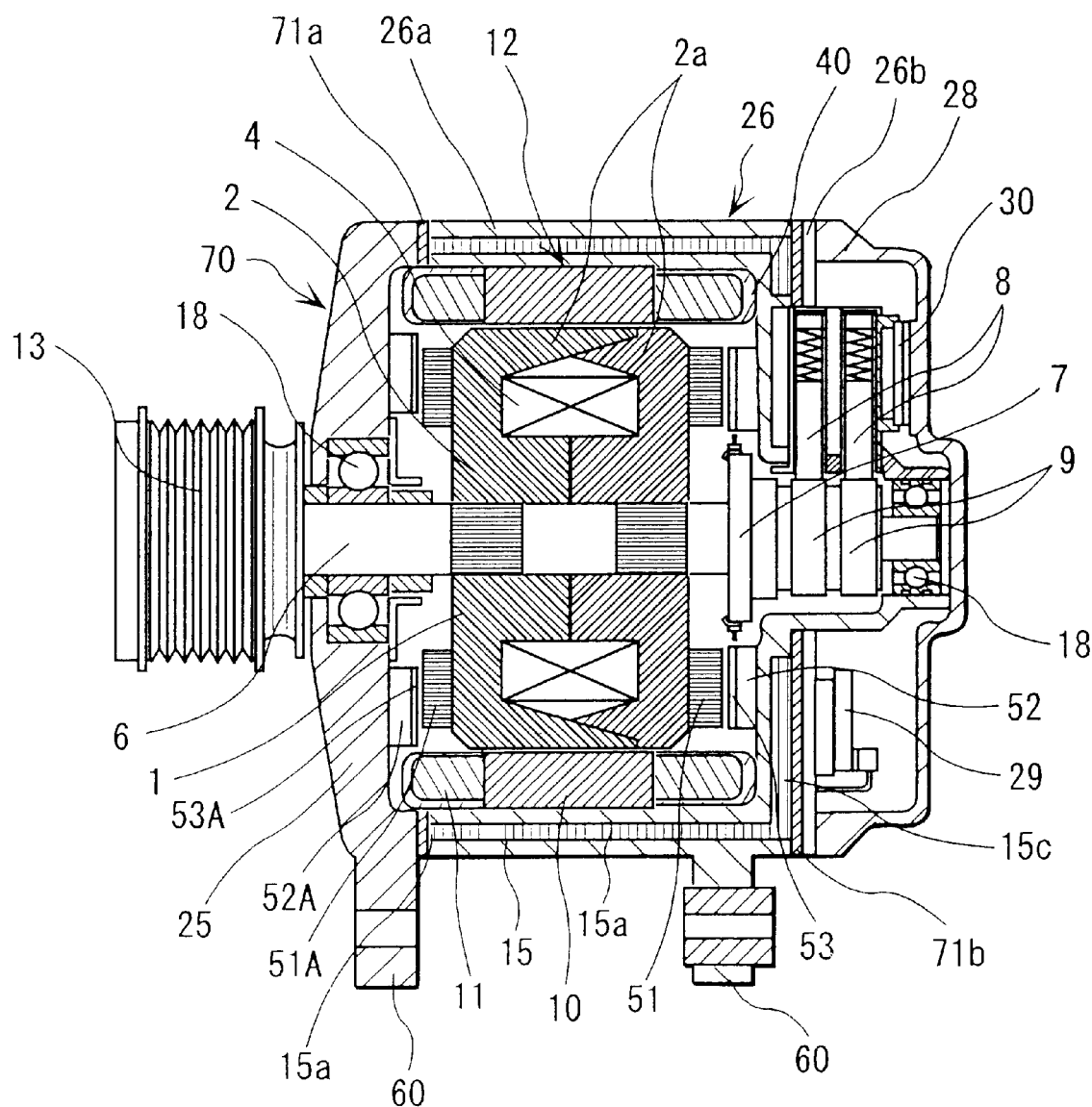
FIG. 1 is a vertically cross-sectioned side view for showing an alternator for use in a vehicle, according to a first embodiment of the present invention.

Hereinafter, embodiments according to the present invention will be fully explained by referring to the attached drawings. Further, the same reference numerals on various drawings of embodiments indicate the same parts or elements, or equivalent ones thereof.

First of all, explanation will be given on a first embodiment of the present invention, by referring to FIGS. 1 through 9.

A total structure of an alternator for use in a vehicle according to the present embodiment will be explained by referring to FIG. 1. This FIG. 1 is a vertically cross-sectioned side view for showing the alternator for use in a vehicle according to the present invention.

A rotor 1 comprises a field pole core 2 for generating magnetic field, fixed onto a rotation shaft 6, and an excitation coil 4 provided on this field pole core 2 for magnetic field, and it is rotated together with the rotation shaft 6. The field pole core 2 builds up a pole core. The rotor 1 generates the N poles and the S poles at claws 2a of the field pole core 2, while being excited by the excitation coil 4, corresponding to the number of poles on the periphery of the rotor. To the excitation coil 4 is supplied DC current through brushes 8, each of which contains carbon mainly and is held within a brush holder, and slip rings being constructed with brush rings 9, each of which is fixed around the rotation shaft 6. Further, a connector terminal 7 is located between the slip ring 9 and the excitation coil 4, so as to connect lead wires from the slip rings and lead wires of the excitation coil 4 thereto, thereby improving workability in assembling thereof.

The exciting coil 4 is built up with winding of the lead wire, which is covered with insulation coating thereon, wound around a bobbin having a property of electric insulation, by a large number thereof. For easily conducting the heat generated in the exciting coil 4 to the field pole core 2 through it, the bobbin is made of, preferably, such as a material being small in heat resistance, for example, a resin selected from organic group, such as, epoxy which is improved in the heat conductivity by dispersing and mixing powder of aluminum oxide therein, or a complex material, obtained by coating insulation paint or resin upon the metal surface of, such as, iron or the like. Also, for dissolving shortage of a power output of the alternator, in particular during when it rotates at a low speed, rear-earth magnets or ferrite magnets are inserted between the claws 2a of the rotor, thereby to increase up the maganetomotive force thereof.

The stator 12 is made up by burying stator coil 11 into slots formed on a stator core 10, which is built up by laminating or piling up steel sheets. The stator 12 is supported by means of a bracket 70. In the present embodiment of generating a three-phase AC output, the number of the slots is selected to be as three-times large as that of the poles. The stator coil 11 is made up with the lead wire covered with insulator coating, being wound around thereon by a large number, and in the slot it is inserted with an insulation sheet between the stator core 10, thereby obtaining both insulation and protection for the insulator coating of the conductor, in common. As the lead wire covered with insulator coating for the stator 11, though being preferable to use a wire of a rectangular cross-section for the purpose of obtaining a high space factor within the slot, however a wire of a round cross-section can be manufactured and wound around, easily. In any event, into the gap(s) within the slot is impregnated vanish, resin or the like, thereby fixing the conductors to each other, as well as, conducting heat generated in the stator coil 11 to the stator core 10 easily.

A part or the entire of the stator coil 11 is covered with a good heat-conductive resin 40, such as a silicon resin, etc., having a relative good thermal or heat conductivity, and further a part of the good heat-conductive resin 40 is in closely contact with an inner surface of the bracket 70. However, after fitting or inserting the stator 12 into the rear bracket 26, the good heat-conductive resin 40 may be inject into the space defined by a rear bracket 26 and the stator coil 11, so that it covers the part or the entire of the stator coil 11. With doing so, it is possible to fill up with the good heat-conductive resin 40 even in and around the stator coil 11 wound around inside the stator core. However, with the material, the position to be filled with, and an amount of use thereof, it is preferable to select the good heat-conductive resin 40 depending on an amount of the heat generation in the stator core 10 and in the stator coil 11.

The bracket 70 is built up with a front bracket 25 and a rear bracket 26, as well as, seal members 71a and 71b, which are disposed between them. This bracket 70, being thermally connected with the stator 12 and the good heat-conductive resin 40, supports the stator 12, as well as, the rotation shaft 6 at both ends of the rotor 1 through shaft bearings 18, and is further provided so that it encloses or shuts off the spaces confronted on both sides of the rotor 1.

The front bracket 25, being made from a metal member having the good heat conductivity, such as iron or aluminum, for example, is built up with a disc portion and a brim portion, wherein at the center of the disc portion is attached the shaft bearing 18, so as to support one side of the rotation shaft 6, and it encloses or shuts off the space confronted on a side of a pulley of the rotor 1. The rear bracket 26 is built up with a rear bracket body 26a, a partition member 26b, and a rear bracket cover 28. The front bracket 25 and also the rear bracket 26 are fixed to, by means of screws, bolts or the like, through a seal member 71a inserted therebetween.

The rear bracket body 26a, being made from a metal member having the good heat conductivity, such as iron or aluminum, for example, has an outer peripheral portion, being thermally connected with the stator core 10 of the stator 12 and the good heat-conductive resin 40, for supporting the stator 12, a side surface portion for enclosing or shutting off the space confronted on a reverse side of the pulley of the rotor 1, and a bearing mounting portion extending outward in the axial direction from that side surface portion, so as to mount the shaft bearing 18 thereon. The partition member 26b, being made from a metal member having the good heat conductivity, such as iron or aluminum, for example, is fixed onto the rear bracket body 26a by means of screws, bolts or the like, through a seal member 71b inserted therebetween, and further being piled up with the rear bracket cover 28 made from a metal member having the good heat conductivity, such as iron or aluminum, for example, thereon. And, between the partition member 26b and the rear bracket cover 28 is defined an electric appliance storage chamber or room.

Onto the partition member 26b is fixed a voltage regulator 30 for maintaining the voltage generated at a constant irrespective of rotation speed thereof by adjusting current to the excitation coil 4, and a rectifier 29 for converting AC generated by the stator coil 11 into DC. Preferably, both the voltage regulator 30 and the rectifier 29 are in good thermal contact with the partition member 26b, by using a grease, etc., for obtaining good heat radiation thereto. The voltage regulator and the rectifier 29 constitute a part of the electric appliances. The partition member 26b separates between a side of the slip ring, the voltage regulator 30 and the rectifier 29, and a side of the rotor 1 and the stator 12, and it also functions as a means for conducting heat from the rear bracket body 26 to a rear bracket cover 28. However, the voltage regulator 30 and the rectifier 29 may be so constructed that each one is fixed onto the rear bracket body 26a directly, if being better in workability of assembling. Also, with the brushes 8 and the brush rings 9, it is necessary to take the provision of, such as, a partition wall, etc., into the consideration, for the purpose of separating them from the surroundings thereof, so that brush powder generated from the friction between both will not fly all over the other parts, thereby causing no breakdown of insulation, etc., for example, in the rectifier 29.

The rotation shaft 6 is supported to be freely rotatable by the front bracket 25 and the rear bracket 26, at both sides of the front and the rear thereof, through the shaft bearings 18.

At the end of the rotation shaft 6 where it projects from the bracket 6 is fitted the pulley 13, to be fixed thereto by a bolt for example. Also, legs 60 are formed on the front bracket 25 and the rear bracket 26, respectively in one body, and then enable attachment and fixing of the alternator onto an engine of the vehicle not shown in the figure.

Figure 2:
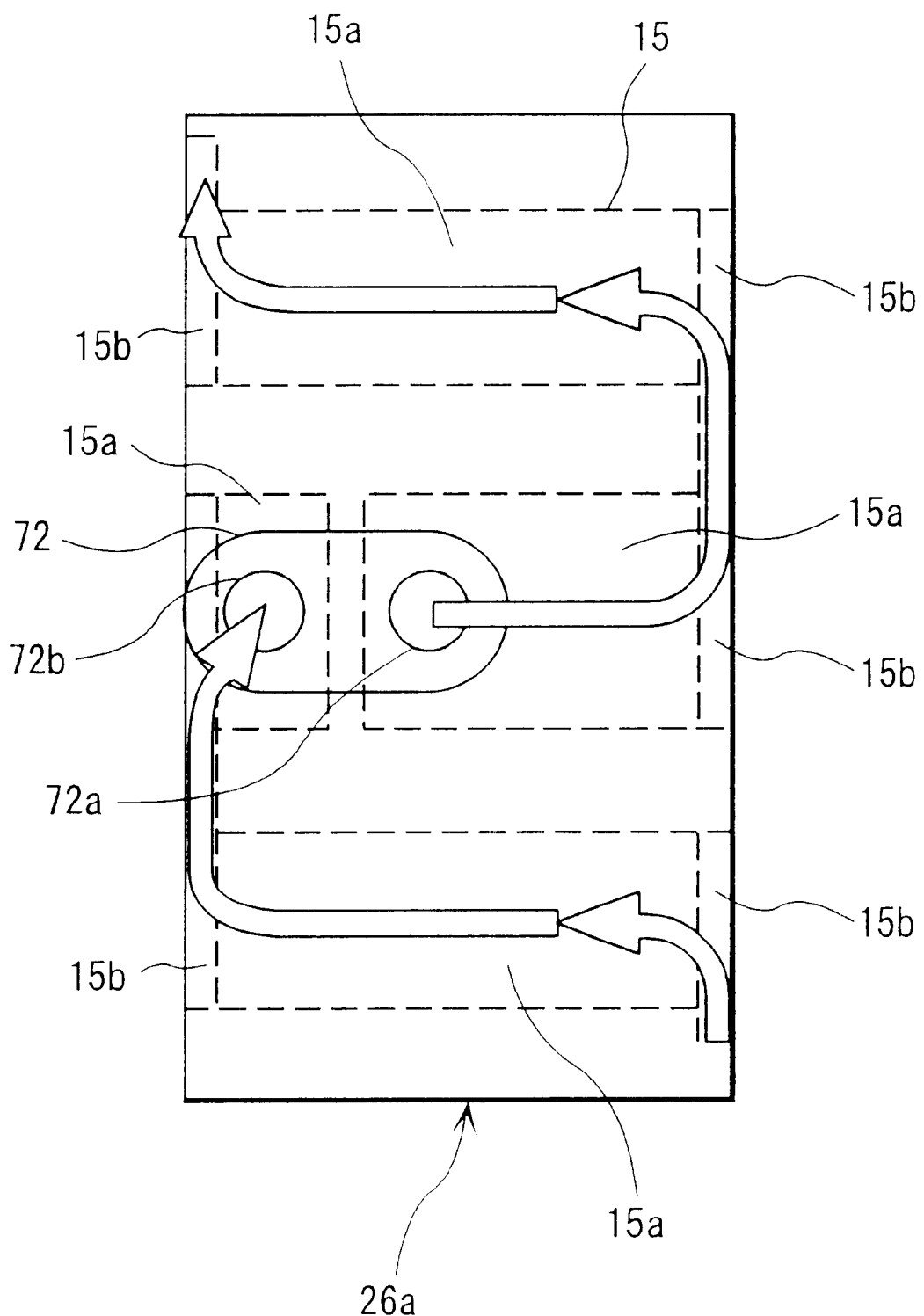
FIG. 2 is a rear side view for explaining cooling water passage of a rear bracket body of the same alternator for use in a vehicle.
Figure 3:
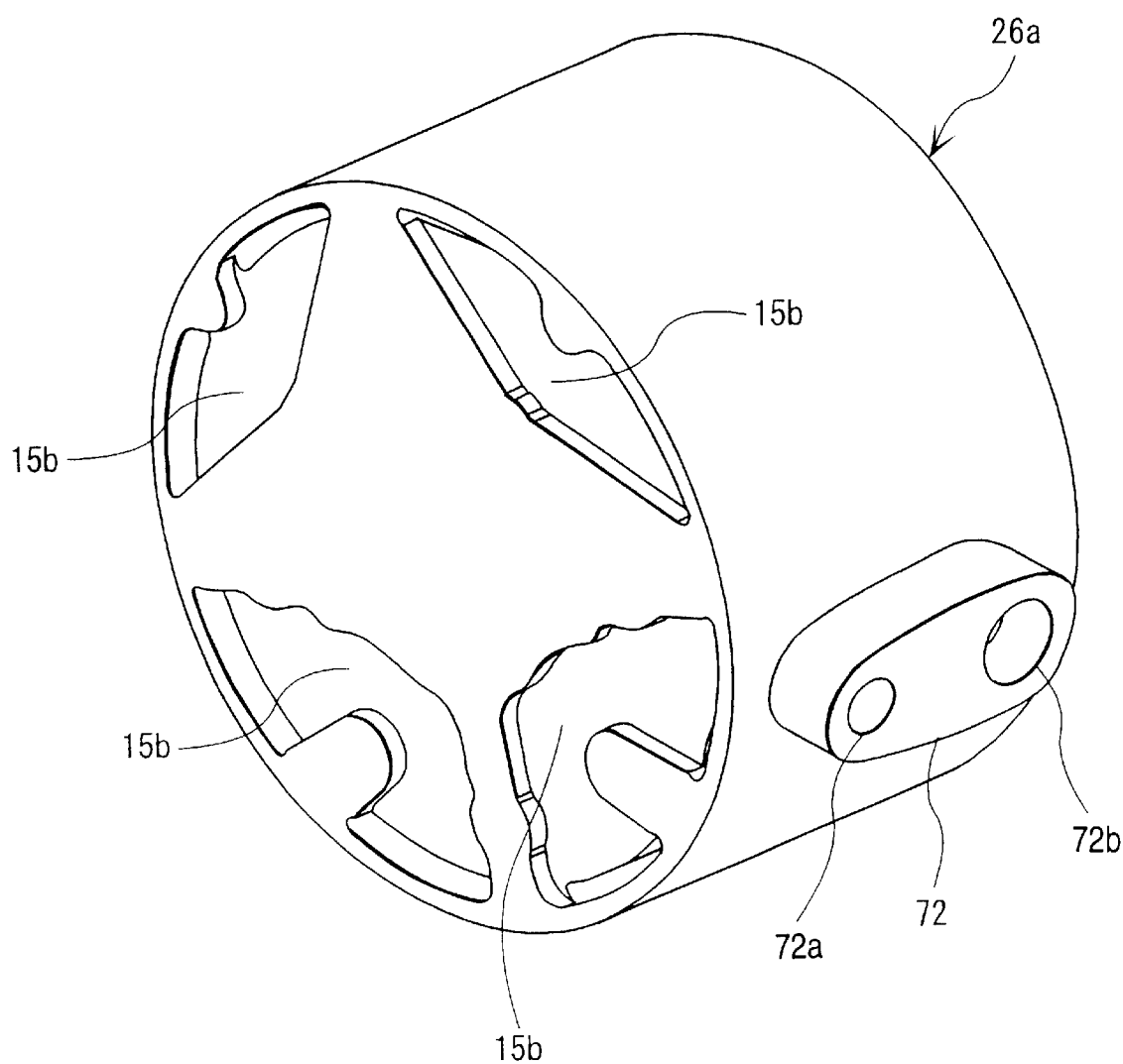
FIG. 3 is a perspective view of a rear bracket body from the rear side, of the same alternator for use in a vehicle.

Next, explanation will be given on the cooling system by means of cooling water in the present embodiment, by referring to FIGS. 1 to 3, mainly. FIG. 2 is a rear side view of the rear bracket body, according to the present invention, for explaining passages of cooling water therein, and FIG. 3 is a perspective view of the same rear bracket body from a rear side. However, the bearing-mounting portion of the rear bracket body 26a is omitted to show in those FIGS. 2 and 3. Also, arrows shown in the FIG. 2 depicts flows of the cooling water.

In the rear bracket body 26a is formed a cooling water passage 15, being formed with outer peripheral cooling water passages 15a, which are formed on an outer peripheral portion thereof, and side surface cooling water passages 15b, which are formed on a side surface thereof. The outer peripheral cooling water passages 15a are provided in plural numbers thereof, and are formed extending in parallel in the axial direction there of. The side surface cooling water passages 15b are formed on both the side surfaces of the rear bracket 26a, alternatively, so that they communicate with the outer peripheral cooling water passages 15a neighboring thereto. And, the side surface cooling water passage 15b formed on a side of the electric appliance(s) extends greatly into the center of a radius, thereby coming close to the electric appliance(s). The side surface cooling water passages 15b are formed to be opened on the side end surfaces of the rear bracket body 26a, however flow passages are defined by holding the front bracket 25 and the partition member 26b with putting the seal members 71a and 71b therebetween. With this, the outer peripheral cooling water passages 15a and the side surface cooling water passages 15b are communicated with one by one, thereby forming one (1) piece of a series connected cooling water passage 15. On a rear surface of the rear bracket body 26a is formed a cooling water mouthpiece 72, being extended therefrom. On this cooling water mouthpiece 72 are formed an inlet 72a for forming an inlet of the cooling water passage 15 and an outlet 72b for forming an outlet thereof. Thus, a cooling liquid, such as cooling water, etc., is supplied from this inlet 72a, to flow within the cooling water passage 15 formed with the outer peripheral cooling water passages 15a and the side surface cooling water passages 15b, as shown by the arrows in the FIG. 2, and is discharged from the outlet 72b. Due to such a circulation of the cooling water, the heat generated in the stator 12 is conducted or transmitted, directly from the stator core 10, and indirectly from the stator coil 11 through the good heat-conductive resin 40 to the rear bracket body 26a, thereby being radiated into the cooling water in the outer peripheral cooling water passages 15a. Accordingly, the stator 12 is cooled down by means of the cooling water, with high efficiency. Also, the heat generation of the electric appliances 29, 30, and so on, is transmitted to the partition member 26b, and further to the rear bracket body 26a through the seal member 71b, thereby being radiated into the cooling water in the side surface cooling water passages 15b. Accordingly, the electric appliances 29, 30, and soon, can be cooled down by means of the cooling water, effectively.

However, by forming the rear bracket body 26a with using the die casting method, it is possible to form the outer peripheral cooling water passages 15a and the side surface cooling water passages 15b, easily, but without treating special mechanical machining thereon.

Figure 4:
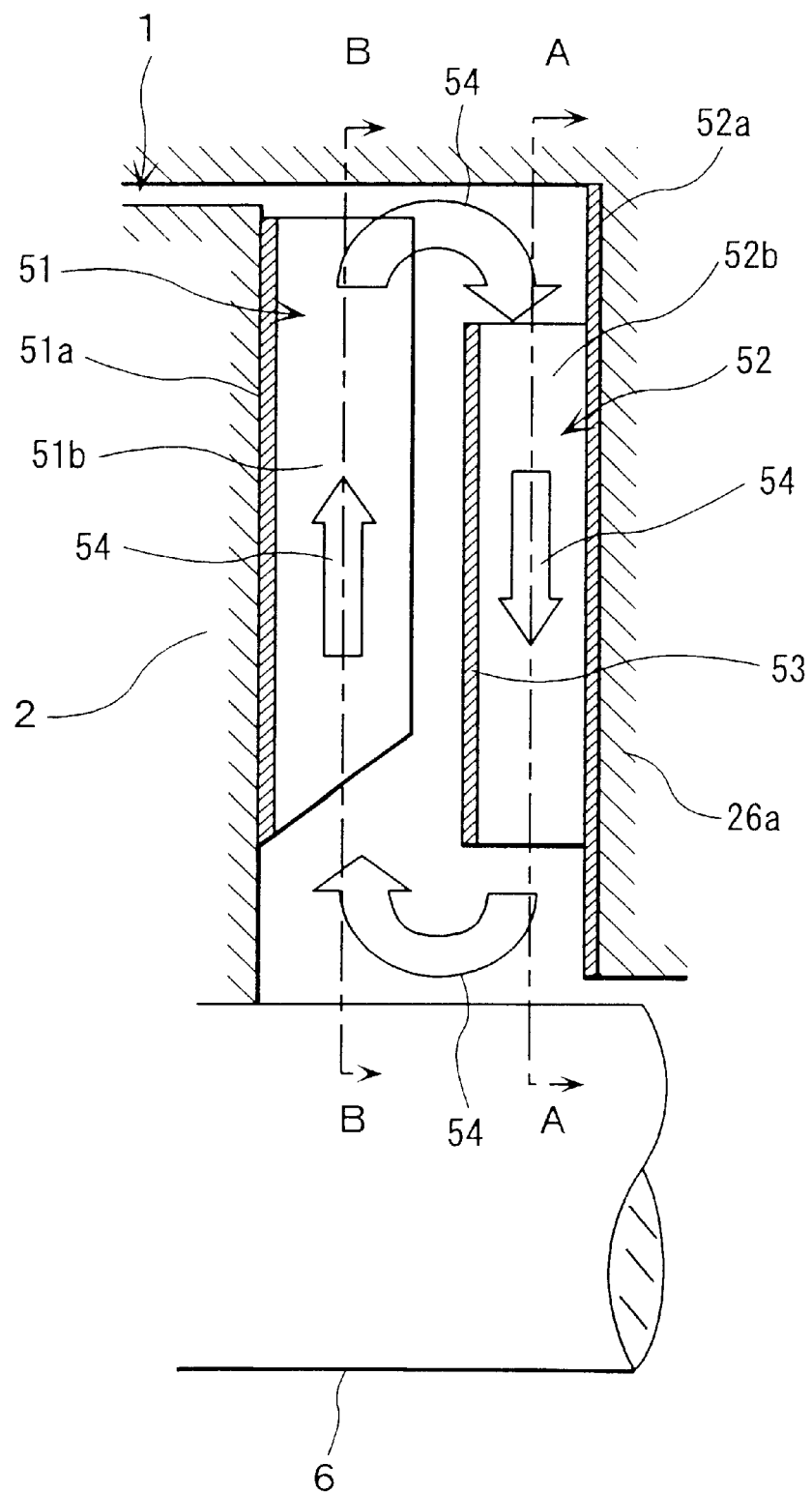
FIG. 4 is a view for explanation of a cooling fan portion of the same alternator for use in a vehicle.
Figure 5:
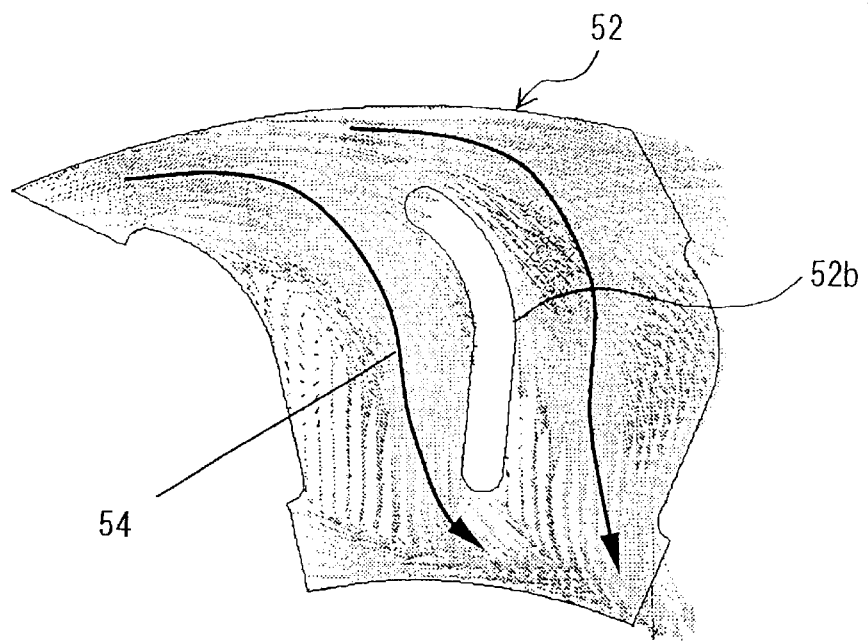
FIG. 5 is a view for explanation of air circulation on A—A cross-section in the FIG. 4.

Next, explanation will be given on the cooling system by means of the cooling fan 51, mainly by referring the FIG. 1 and the FIGS. 4 through 9. FIG. 4 is a view for explanation on the cooling fin according to the present embodiment, FIG. 5 for explanation about the circulation flow of an air on the A—A cross-section of the FIG. 4, FIG. 6 for explanation about the circulation flow of the air on the B—B cross-section of the FIG. 4, FIG. 7 a perspective view of the cooling fan to be used in the present embodiment, FIG. 8 a perspective view of the cooling fin to be used in the present embodiment, and FIG. 9 a perspective view of the fin guide and the cooling fin to be used in the present embodiment, under the condition of being combined with.

The cooling fan 51 is a fan of centrifugal type, with which an air is sucked from the central portion thereof to be discharged from the outer peripheral portion thereof, and is provided being thermally connected to the closed side of the rotor 1. This cooling fan 51 is formed from a metal plate of, such as iron or aluminum, etc., having good heat conductivity, and has a plate portion 51a having a circular opening at the central portion thereof and plural numbers of blades 51b, being projected by cutting and standing so as to be extended in the radial direction thereof. The plate portion 51a is in face-contact with an end surface of the field pole core 2 all over the entire periphery thereof, so as to be thermally connected therewith, and is attached by means of screws, bolts, etc.

The cooling fan 51 is so constructed that it is thermally connected with the rotor 1 in the present embodiment, however it may be constructed not to be thermally connected therewith, and in such the case, preferably the rotor 1 is so constructed that it comes in contact with a flow 54 of the air circulation upon an area as large as possible.

The cooling fin 52 is located, opposing to the cooling fan 51, in the vicinity of the cooling water passage 15, and it is also connected with the rear bracket 26, thermally. This cooling fin 52 is made from a metal member of good heat conductivity, such as, iron, aluminum, etc., and comprises a disc portion 52a having a circular opening at the central portion thereof, and plural numbers of fin portions 52b extending into the radial direction thereof. The disc portion 52a is in face-contact with an interior surface of the side surface portion of the rear bracket body 26a upon the entire periphery thereof, so as to be thermally connected therewith, and is attached by means of screw, bolts, etc. Also, the fin portion 52b is so constructed that the outer peripheral portion thereof is inclined in the direction of an outflow angle of the cooling fan 51, while the inner peripheral portion is directed to the central portion, in the configure thereof.

The fin guide 53 is provided for partitioning between the cooling fan 51 and the cooling fin 52, as well as, being connected with the cooling fin 52, thermally. This fin guide 53 is formed from a metal plate of good heat conductivity, such as, iron, aluminum, etc., and is configured in the shape of a disk-like ring, having a circular opening at the central portion thereof. The cooling fin 52 and the fan guide 53 are for the purpose of forming a return flow passage for circulating airflow generated by the cooling fan 51 smoothly.

The cooling fan 51A is configured in the shape almost equal to that of the cooling fan 51, and is provided at the end surface on the other side of the field pole core 2, in symmetrical with respect to the cooling fan 51. Also, the cooling fin 52A and the cooling guide 53A are configured in the shapes almost equal to those of the cooling fin 52 and the fin guide 53, and are provided on the inner surface of the front bracket 25 in symmetrical with the cooling fin 52 and the fin guide 53.

The functions of the cooling fan 51A, the cooling fin 52A and the fin guide 53A are almost same to those of the cooling fan 51, the cooling fin 52 and the fan guide 53, therefore here is omitted the detailed explanation thereof. However, since it has no such passage for the cooling water therein, the difference lies in an aspect that the front bracket 25 radiates the heat taken out of the circulating airflow from an outer surface of the front bracket 25, and/or that it radiate the heat to the rear bracket 26a having the cooling water passage therein.

Next, explanation will be given on the cooling operation of the rotor 1.

Figure 6:
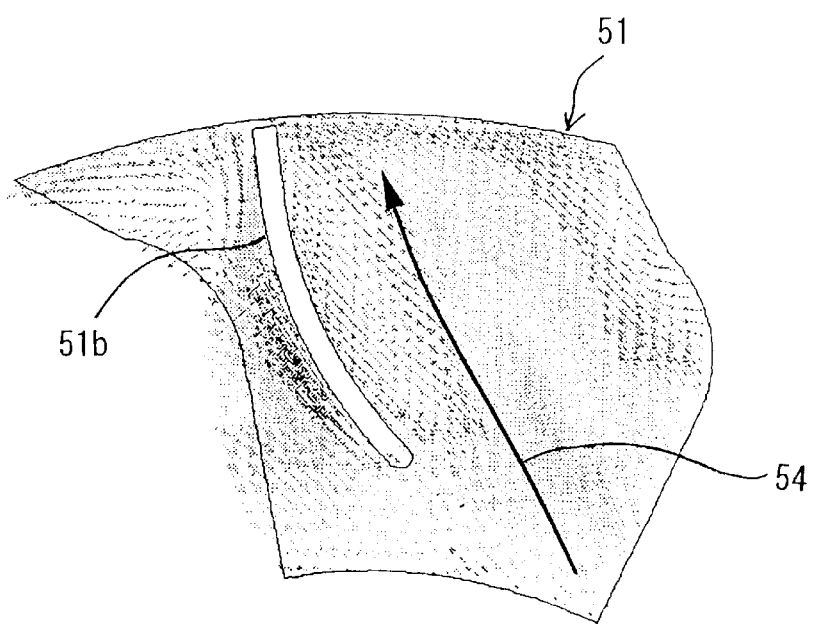
FIG. 6 is a view for explanation of air circulation on B—B cross-section in the FIG. 4.
Figure 7:
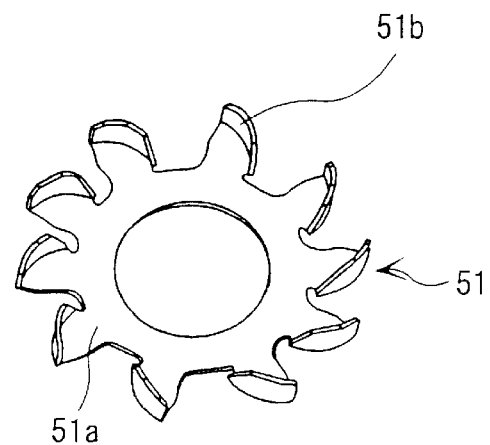
FIG. 7 is a perspective view of a cooling fan, which is used in the same alternator for use in a vehicle.
Figure 8:
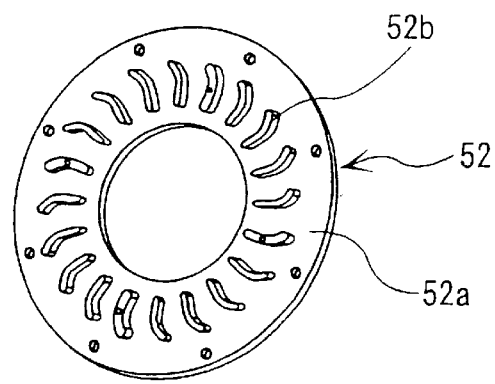
FIG. 8 is a perspective view of a cooling fin, which is used in the same alternator for use in a vehicle.
Figure 9:
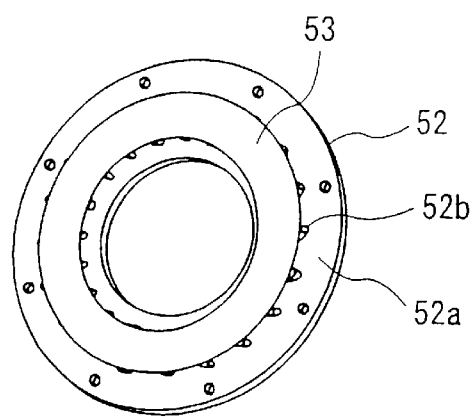

When the rotor 1 rotates, also the cooling fan 51 attached thereon rotates around, and by the function of the fins 51b extending in the radial direction, the air filled within the spaces, being closed at both sides of the rotor respectively, is sucked from the central portion of the cooling fan 51, as shown by arrows and flow lines in the FIGS. 4 and 6, to be emitted from the outer peripheral portion of the cooling fan 51. The air emitted from, passing through the return passage formed by the fin portion 52b, as shown by the arrows and flow lines in the FIGS. 4 and 6, is sucked again from the central portion of the cooling fan 51, after being guided to the central portion thereof, thereby forming the airflow circulation 54. In this case, by the function of the fin portion 52b, extending in the radial direction thereof while opposing to the cooling fan 51, the air circulation flow 54 is formed smoothly. In particular, with such the structure that an outer periphery portion of the fin portion 52b is inclined into the counter-rotation direction of the cooling fan 51 while an inner periphery portion is directed to the central portion thereof, it is possible to guide the airflow, including circling flows emitted from the cooling fan 51, into the central portion, smoothly. With this, the circulating flow of air can be obtained with low noises, and is less in pressure loss. Since the fin portion 52b and the fin guide 53 define the return passage, the air circulation flow 54 can be formed smoothly, also from this viewpoint, thereby obtaining it with less in pressure loss. And, since the fin guide 53 is thermally connected with the fin portion 52b, even that fin guide 53 can cool down the air circulation flow 54; therefore it is possible to obtain an improvement in the cooling efficiency.

Accordingly, the heat generated in the rotor 1 is transmitted to the cooling fan 51, and is further radiated into the air circulation flow 54. In more details, the heat generated in the excitation coil 4 of the rotor 1 is transmitted to the plate portion 51a from the field pole core 2, and further to the fins 51b thereof, and it is radiated from the surfaces of the plate portion 51a and the fins 51b into the air circulation flow 54. In this instance, since the plate portion 51 is attached onto the end surface of the field pole core 2 over the entire periphery thereof in thermally contact with it, the heat transmission can be conducted preferably from the field pole core 2 to the cooling fan 51. Further, since the heat is radiated into the airflow circulation 54 by utilizing the plate portion 51a and the blades 51b, being wider in the area than that of the end surface of the field pole core 2, an amount of heat radiation can be increased greatly, accompanying with the improvement in the heat conductivity due to the airflow circulation 54. However, the heat generated in the rotor is also radiated into the airflow circulation 54 from the field pole core 2.

Also, the side surface portion of the rear bracket body 26a is cooled down by the cooling water flowing in the side surface cooling water passage 15b, and then the cooling fin 52 is cooled down by this side surface portion, and further the fin guide 53 is cooled down. The heat radiated into the airflow circulation 54 mentioned above is absorbed to the cooling fin 52 and the fin guide 53 when it passes through the cooling fin 52 and the fin guide 53, which are cooled down by the cooling water, and is further absorbed to the cooling water flowing within the outer periphery cooling water passages 15a through the rear bracket body 26a. With this, the airflow circulation 54, being cooled down, is sucked into the cooling fan 51, and repeating the same operation of heat radiation thereafter. Further, the side surface portion of the rear bracket body 26a, which is cooled down by the cooling water flowing through the side surface cooling water passages 15b, also cools down those electric appliances 29, 30 and so on, as was mentioned previously.

With the cooling fin 52, since having the plural numbers of fin portions 52b extending into the radial direction thereof, it is possible to make the heat resistance small with respect to the airflow circulation 54. Further, since the heat generation in the rotor 1 is as small by one digit (or one/tenth ($\frac{1}{10}$)) as that in the stator coil 10, or less than that, the necessary airflow circulation 54 may be less, comparing to that necessary for air-cooling of the stator core 10 too. Therefore, it is not necessary that the fan height of the cooling fan 51 according to the present embodiment is as tall as in the conventional alternator for use in a vehicle of air-cooling type, and then the volume, including the cooling fan 51 and the cooling fin 52 of the present embodiment, can be kept to be equal or less than that occupied by the cooling fan in the alternator for use in the air-cooling vehicle, thereby enabling suppression of an increase in sizes in the axial direction of the alternator for use in a vehicle.

Further, in the present embodiment, though the cooling fin 52 is provided separately from the rear bracket body 26a, but it may be made up in one body together with the rear bracket body 26a, in particular, in the case of manufacturing the rear bracket body 26a through the aluminum die casting. With this, it is possible to bring about good heat conductivity to the fin portion 52b while suppressing cost-up, thereby increasing the cooling effect, and also possible to obtain further drop down in temperature of the rotor 1.

On the other hand, when the rotor 1 rotates, the cooling fan 51A also rotates around, thereby bringing about the airflow circulation, in the same manner as was mentioned above relating to the cooling fin 52, so as to transmit the heat generated in the rotor from this airflow circulation to the cooling fin 52A and the fin guide 53A, and thereby enabling further heat radiation through the front bracket 25.

As was mentioned above, with such the structure that the space, in which the cooling fan 51, the cooling fin 52, the fin guide 53 and the cooling fan 51A on both sides of the rotor 1, the cooling fin 52A, and the fin guide 53A are disposed, is closed up, it is possible to prevent aerodynamic noises generated by the cooling fans 51 and 51A from leaking out into an outside thereof. With this, it is possible to lower the noises being uncomfortable to the driver. Also, even in the case where the vehicle, which installs therein the alternator for use in a vehicle according to the present embodiment, is submerged or goes under water, it is possible to obtain weather resistance or weatherproof, thus maintain the performance by protecting the rotor 1 from infiltration of water therein. Further, in particular when the noises come to be problem at high-speed rotation, with provision of the cooling fans 51 and 51A and the cooling fins 52 and 52A at unequaled pitch distance therebetween, it is possible to remove away large noises of single frequency occurring with an equal pitch, thereby dispersing the frequency components of the noises. With this, it is further possible to lower the noises being uncomfortable to the driver.

In the present embodiment, by means of the bracket 70, the stator 12 is supported while being thermally connected with and the rotor 1 is closed at one side thereof, and with provision of the cooling water passage 15 in the bracket 70 while the cooling fan 51 at the closed side of the rotor 1, and further with provision of the cooling fin 52 opposing to the cooling fan 51 in the vicinity of the cooling water passage 15, it is possible to achieve an alternator for use in the vehicle, in which the stator 12 and the rotor 1 can be cooled down effectively, with low noises, thereby obtaining a high power output therefrom.

Figure 10:
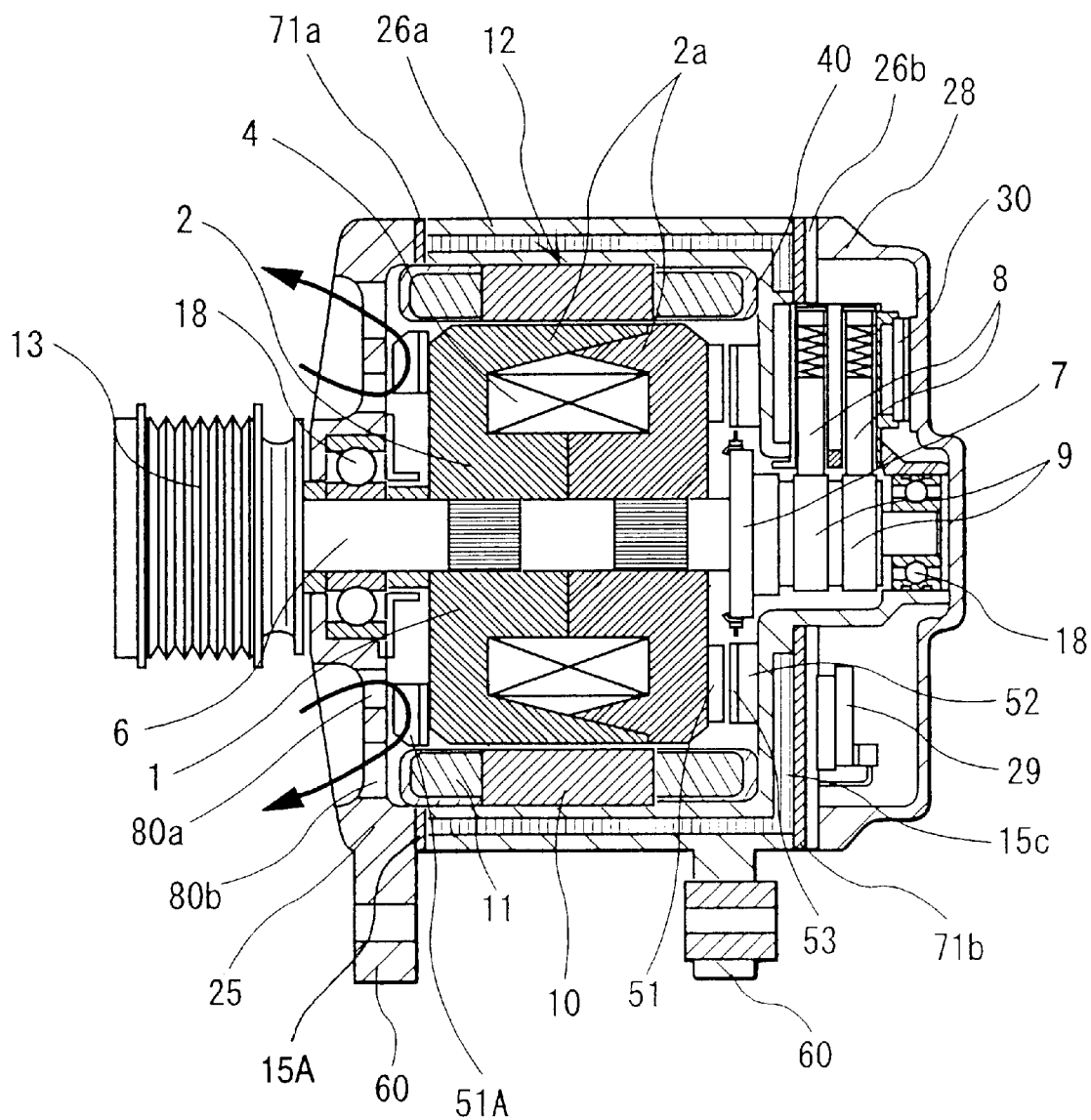
FIG. 10 is a vertically cross-sectioned side view f or showing an alternator f or use in a vehicle, according to a second embodiment of the present invention.

Next, explanation will be given on a second embodiment of the present invention, by referring to FIG. 10. This FIG. 10 is a vertically cross-sectioned side view for showing the alternator for use in an automobile, according to the second embodiment of the present invention.

The present embodiment differs from the first embodiment, in an aspect that plural numbers of inlet openings 80a and outlet openings 80b for fan cooling air are formed on all around the front bracket 25, but no such the cooling fin and fin cover is provided on the front bracket side, however it is basically same to the first embodiment in aspects other than that.

Since the cooling fan 51A rotates together with the rotor 1 in one body, it is possible to take the air outside into, thereby obtaining very good cooling of the rotor 1. With such the improvement in the cooling capacity of the rotor 1, it is possible to improve reliability much more. Furthermore, with provision of the inlet openings 80a and the outlet openings 80b for fan cooling air, also fan noises due to the cooling fan 51A leak out therethrough, however since an amount of airflow generated by the cooling fan 51A is enough to cool down the one side of the rotor 1, no such the large noises will not come out as in the conventional alternator for the air cooling vehicle.

Next, explanation will be given on a third embodiment of the present invention, by referring to FIGS. 11 through 17.

Figure 11:
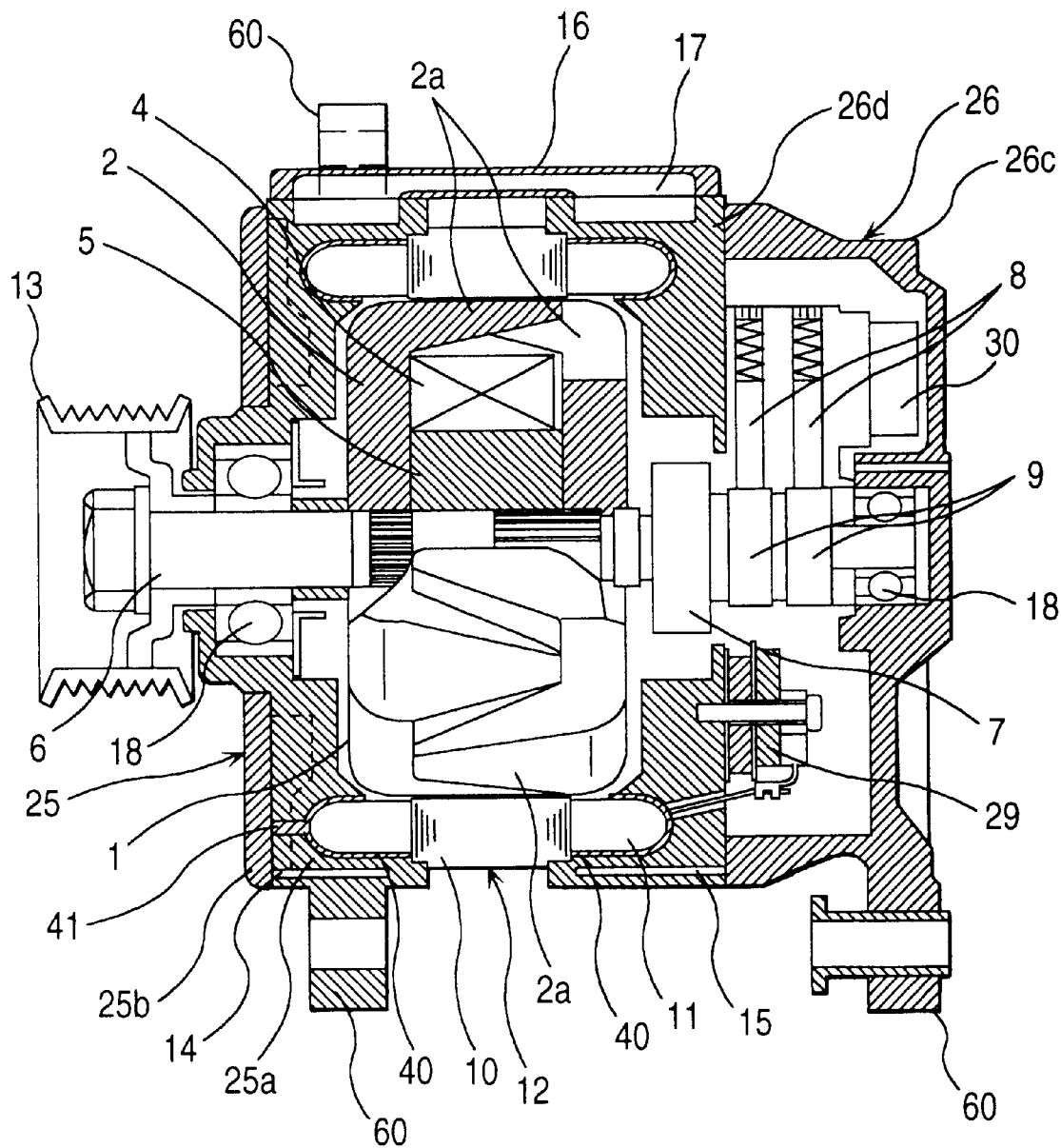
FIG. 11 is a vertically cross-sectioned side view f or showing an alternator for use in a vehicle, according to a third embodiment of the present invention.

First, explanation will be made about the total structure of the alternator for use in a vehicle according to the present embodiment, by referring to FIG. 11. This FIG. 11 is a vertically cross-sectioned side view for showing the alternator for use in the vehicle, according to the third embodiment of the present invention.

The rotor 1 comprises the field pole core 2 and a field core 5, which are fixed onto the rotation shaft 6, and the excitation coil 4, which is provided around the field core 5, and they rotate around together with the rotation shaft 6. However, the field pole core 2 and the field core 5 build up a pole core. And, the rotor 1, being excited by the excitation coil 4, generates the N poles and the S poles at the claws 2a of the field pole core 2, on the periphery of the rotor, corresponding to the number of poles. To the excitation coil 4 is supplied DC current through brushes 8, each mainly containing carbon therein and being held within a brush holder, and slip rings constructed by brush rings 9, each being fixed around the rotation shaft 6. Further, the connector terminal 7 is located between the slip ring 9 and the excitation coil 4, so as to connect the lead wires from the slip rings and the lead wires of the excitation coil 4 thereto, thereby improving workability in assembling thereof.

The exciting coil 4 is built up with winding of the lead wire, which is covered with insulation coating thereon, wound around a bobbin of electric insulation property, by a large number thereof. For easily conducting the heat generated in the exciting coil 4 to the field core 5 and the field pole core 2 through it, the bobbin is made of, preferably, such as a material being small in heat resistance, for example, a resin selected from organic group, such as, epoxy which is improved in the heat conductivity by dispersing and mixing powder of aluminum oxide therein, or a complex material, obtained by coating insulation paint or resin upon the metal surface of, such as, iron or the like. Also, for dissolving shortage of a power output of the alternator, in particular when rotating at a low speed, rear-earth magnets or ferrite magnets are inserted between the claws 2a of the rotor, so as to increase up maganetomotive force.

The stator 12 is made up, by burying stator coil 11 into slots formed on a stator core 10, which is built up by laminating steel sheets. In the present embodiment of generating a three-phase AC output, the number of the slots is selected as three-times large as that of the poles. The stator coil 11 is made up with the lead wire covered with insulator coating thereon, being wound around by a large number thereof, and within the slot is inserted an insulation sheet being put between the stator core 10, thereby obtaining both insulation and protection for the insulator coating of the conductor, in common. As the lead wire covered with insulator coating for the stator 11, though it is preferable to use a wire of a rectangular cross-section for obtaining a high space factor within the slot, however a wire of a round cross-section can be manufactured and wound around, easily. In any event, into the gaps within the slot is impregnated vanish, resin or the like, thereby fixing conductors to each other, as well as, conducting heat generated in the stator coil 11 to the stator core 10 easily.

The stator core 10 is held between the front bracket body 25a and the rear bracket cover 26d at the front and rear thereof, and is securely fixed thereon by means of a through-bolt (not shown in the figure) together with the rear bracket body 26c. In the present embodiment, the rear bracket 26 is divided into a rear bracket body 26c and a rear bracket cover 26d, while dividing the front bracket 25 into the front bracket body 25a and the front bracket cover 25b, but it is not necessary to be divided from a functional view point. However, by taking the case of manufacturing thereof through the die casting into the consideration, it comes to be necessary to divide them, as in the present embodiment. However, in the case of manufacturing, not through the die-casting, but through the casting process, they may be of the structure in one body.

The rotation shaft 6 is supported while being freely rotatable, by the bearings 18 at the both front and rear side portions thereof, onto the front bracket 25 and the rear bracket 26. At one end of the rotation shaft, on the front bracket side thereof, the pulley 13 is provided for transmitting motive force generated from an engine. On the front bracket body 25a and the rear bracket body 26c are provided supporting legs 60 for fixing the alternator for use in a vehicle onto the engine.

Onto the rear bracket cover 26d are fixed the voltage regulator 30 for keeping the power generation voltage at a constant irrespective of the rotation speed thereof, by regulating current to the excitation coil 4, and the rectifier 29 for converting AC generated by the stator coil 11 into DC. Preferably, both the voltage regulator 30 and the rectifier 29 are in good thermal contact with the rear bracket cover 26d, for example, by using a grease, etc., for obtaining good heat radiation thereto. The rear bracket cover 26d is divided between a side of the slip ring, the voltage regulator 30 and the rectifier 29, and a side of the rotor 1 and the stator 12, and it also functions as a means for heat conduction from the stator coil 11 to the rear bracket body 26c. However, the voltage regulator 30 and the rectifier 29 may be fixed onto the rear bracket body 26c, if being better with workability in assembling. Also, with the brushes 8 and the brush rings 9, it is necessary to take provision of, such as, a partition wall, etc., into the consideration, for the purpose of separating them from the surrounding thereof, so that brush powder generated from the friction between them will not fly all over the other parts, thereby not causing breakdown of insulation, etc., for example, in the rectifier 29.

In the front bracket body 25a and the rear bracket cover 26d are provided cooling water passages 14 and 15 extending on the periphery thereof (in the present embodiment, extending all around the entire periphery). However, since each of the cooling water passages 14 and 15 must be formed in the shape being opened at one surfaced thereof when manufacturing the front bracket body 25a and the rear bracket cover 26d through the die casting method, then in the present embodiment, the passages are sealed by the front bracket body 25a and the rear bracket cover 26d with keeping water-tightness therebetween, to be closed at the opening portions thereof.

The distance between the front bracket body 25a and the rear bracket cover 26d and the stator coil 11 is made as small as possible, and also a filler 40A, such as silicon, etc., is filled up therein, so as to obtain good heat conductivity with each other. As this filler 40A, it is preferable to use a material that is as high in the heat conductivity as possible. However, that having high heat conductivity is also high in the price thereof, then it must be selected to keep balance between the cost and the output capacity there if. And, on the bracket to be assembled at the last in the assembling processes, thus on the front side of the front bracket body 25a in the case of the FIG. 11, is provided an injection opening 41, through which the filler 40A is injected into. An amount of injection thereof should not exceed the volume of the space to be filled up with it. With this, it is possible to prevent the filler 40A from leaking out to the other portions thereof.

The cooling water passage 14 of the front bracket body 25a and the cooling water passage 15 of the rear bracket cover 26d communicate with each other through a coupler member 16. This coupler member 16 has two (2) cooling water passages (i.e., defining round passages) 17: the former for guiding from the cooling water passage 15 of the rear bracket 26b to the cooling water passage 14 of the front bracket 25a, while the latter turning from the cooling water passage 14 of the front bracket 25a back to the cooling passage 15 of the rear bracket 26b, again.

Figure 12:
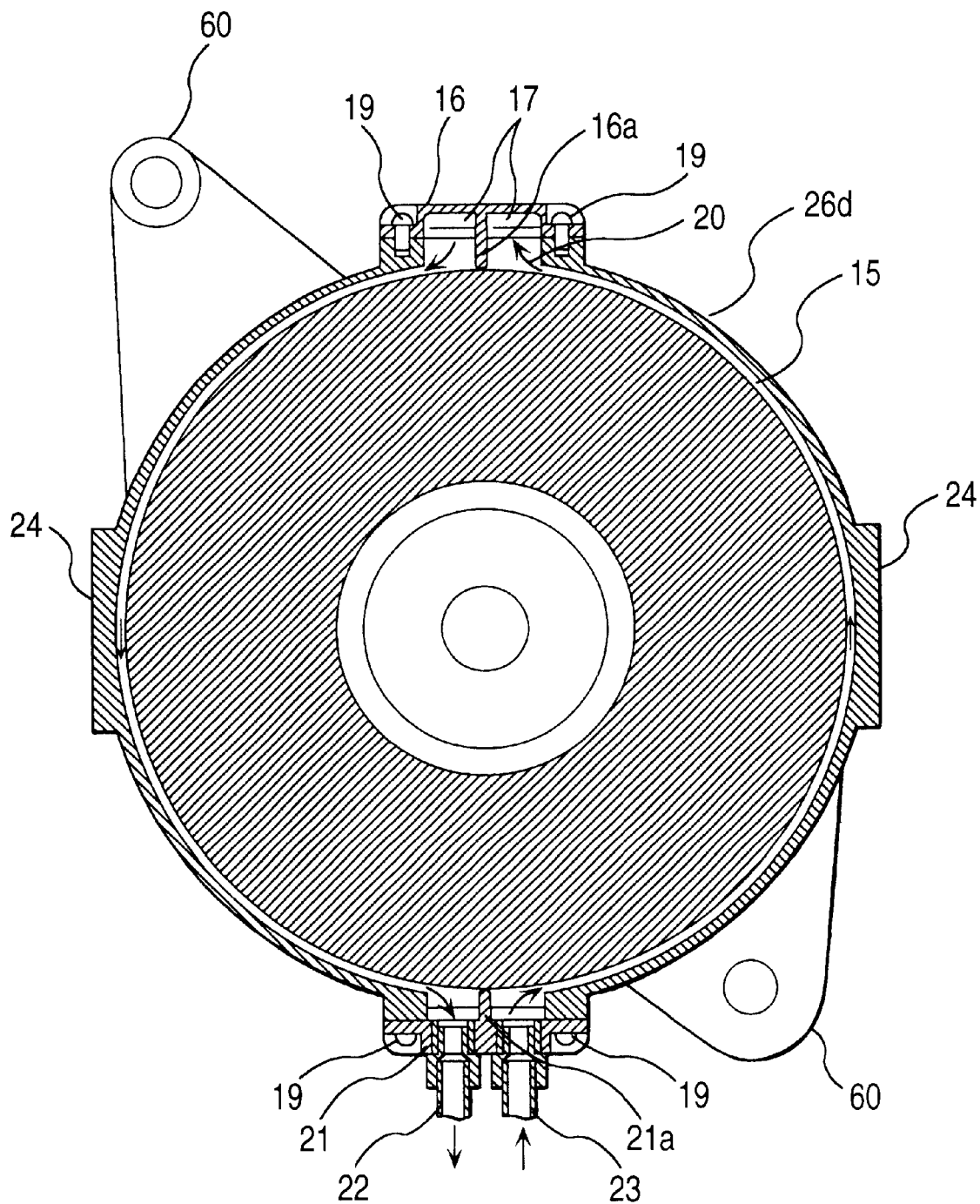
FIG. 12 is a vertically cross-sectioned front view of a rear bracket portion of the same alternator for use in a vehicle.
Figure 13:
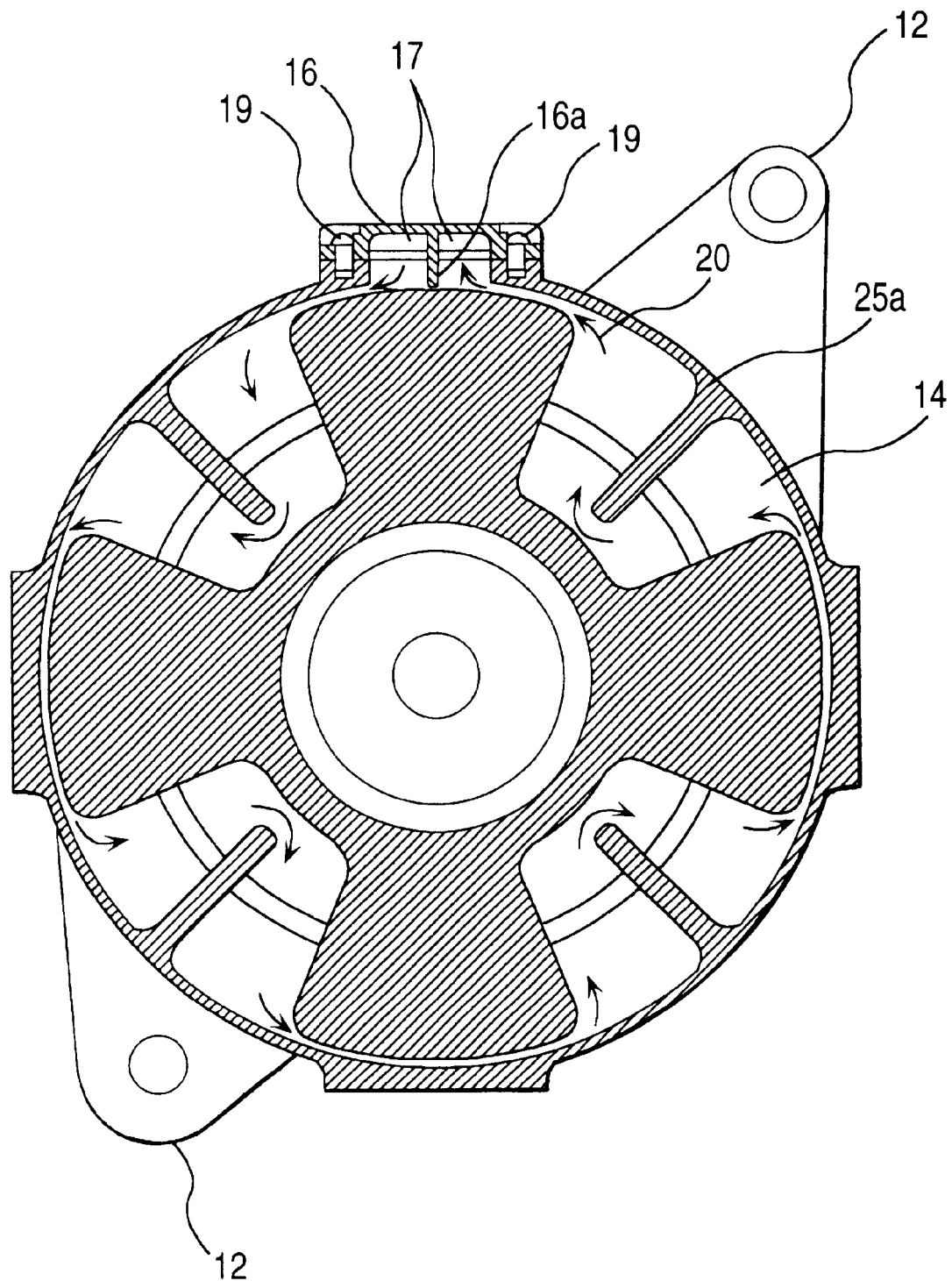
FIG. 13 is a vertically cross-sectioned front view of a front bracket portion of the same alternator for use in a vehicle.

The detailed structure of the cooling water passages 14 and 15 will be explained by referring to FIGS. 12 through 17. FIG. 12 is a vertically cross-sectioned front view of the rear bracket portion, according to the present embodiment, FIG. 13 a vertically cross-sectioned front view of the front bracket portion according to the present embodiment, FIG. 14 a cross-section view of a principle portion for showing a variation of an attachment portion of the coupler member according to the present embodiment, FIG. 15 a perspective view of a single body of the coupler member according to the present embodiment, under the condition of being turned over, FIG. 16 a perspective view for showing a variation of that shown in FIG. 15, and FIG. 17 an explanatory view of a cooling water system of the alternator for use in the vehicle according to the present embodiment, with and without the coupler member thereon. Further, arrows 20 shown in those figures indicate flowing directions of the cooling water.

The passages 14 and 15 for cooling water in the front bracket 25 and the rear bracket 26 are formed in closed loops, respectively. The closed loop may be in any kind of shape, so that a necessary cooling area can be obtained therefrom. The cooling water passage 15 of the rear bracket cover 26d is, as shown in the FIG. 12, in a simple ring-like shape in the cross-section, so that it extends along with the periphery of an outer surface thereof. The coefficient of heat transfer of the cooling water, mainly containing water therein, in general, reaches up to around several thousands $W/m^2K$, although depending upon the flow velocity thereof, therefore the heat resistance, which can be obtained by multiplying that value by the cooling area, i.e., the area of a wet edge of the cooling water passage 15, is fully smaller than the heat resistance of the other portions. Accordingly, it is enough that the cooling water passage 15 has almost such the shape as shown in the FIG. 12. However, in the case where the heat resistance is large inside the bracket, it is preferable to use the cooling water passage, extending into the peripheral direction, as shown in the FIG. 13, and meandering into the central direction, as well. In the present embodiment, the cooling water passage 14 is in such the simple ring-like shape in the cross-section, as shown in the FIG. 12, while the cooling water passage 15 is in such the meandering shape in the cross-section there of, as shown in the FIG. 13. However, the shapes of the cooling water passages 14 and 15 give no ill influence upon the const thereof, even if they are in any kind of the shape, as far as the die for them can be made up, in particular, in a case of producing the front bracket body 25a and the rear bracket cover 26d through the die-cast manufacturing method of, such as aluminum, etc.

Attachment portions 24 for the coupler members are formed, respectively, at plural numbers of locations in an outside of the positions where the cooling water passages 14 and 15 of the front bracket body 25a and the rear bracket cover 26d come close to the outer peripheral surface thereof (according to the present embodiment, four (4) places), in the condition of being closed up. Each of the coupler member attachment portion 24 has a flat surface on an outside thereof, being a little bit thicker than that on outside of the cooling water passages 14 and 15, so that the bolts 19 for fixing the coupler member 16 thereon can be screwed up, and is made up together with the front bracket body 25a and the rear bracket 26d in one body. Those coupler member attachment portions 24 are appropriately selected to attach the coupler members 16 and water supply/discharge attachment members 21 thereon, corresponding to the kind of an automobile to be applied into, and are used with drilling openings for communication at the central portion of the flat surface thereof.

In this manner, with provision of the plural numbers of the coupler member attachment portions 24 for attaching the water supply/discharge attachment members 21 and the coupler members 16 thereon, in advance, while drilling them with holes only the places where the water supply/discharge attachment members 21 and the coupler members 16 are provided, it is possible to achieve cost lowering due to the merit of mass production thereof, without necessity of changing the design of the brackets for each of the various kinds of automobiles.

Figure 14:
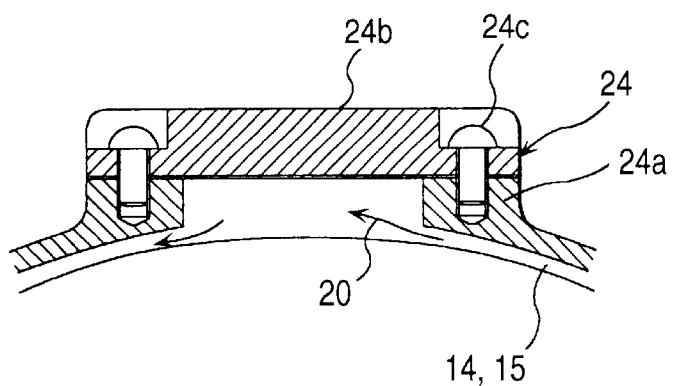
FIG. 14 is a cross-section view of a principle portion for showing a variation of an attachment portion of a conduction member in the same alternator for use in a vehicle.

However, the coupler member attachment portions 24, as apparent from the FIG. 14, may be built up with: coupler member attachment portions 24, being formed in the condition of being opened at plural numbers of positions on an outside where the cooling water passages 14 and 15 of the front bracket body 25a and the rear bracket cover 26d come close to the outer periphery surface thereof; closing members 2b for closing or shutting them down; and bolts 24c for fixing them thereon, thereby to obtain the same effect. With such the structure, though bringing about a labor for attaching the closing members 24b in advance, as well as cost-up thereof, however the coupler members 16 can be attached by only replacing them with the closing members 24b taken out when attaching the coupler members 16, thereby being superior in assembling work of the coupler members 16.

Figure 15:
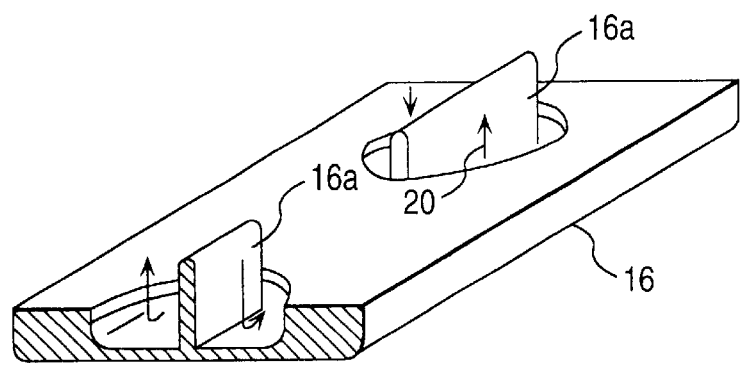
FIG. 15 is a perspective view of a single body of the conduction member of the same alternator for use in a vehicle, under the condition of being turned over.
Figure 16:
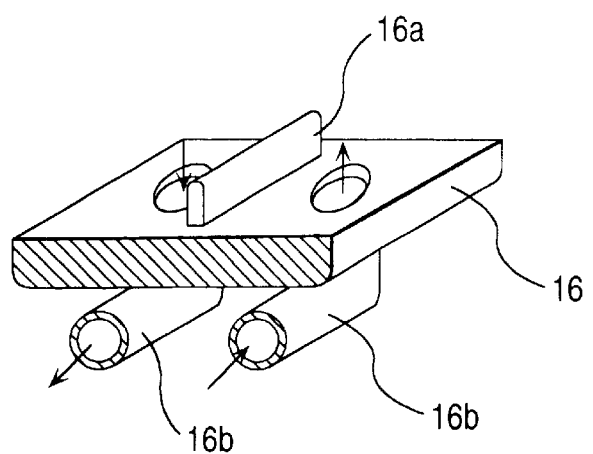
FIG. 16 is a perspective view for showing a variation of the conduction member shown in the FIG. 15.

And, each the coupler member 16, as shown in FIG. 15, is formed in a rectangular shape, as a whole, with thin thickness, being hollowed inside, and has a communication passage 17 having openings at both side portions of the flat surface thereof. This communication passage 17 is partitioned into the right-hand side and the left-hand side by a cooling-water partitioning portion 16a, being formed in one body therewith, thereby forming the round passages for cooling water. The cooling-water partitioning portion 16a is formed at the portion where it communicates with the cooling water passages 14 and 15 of the front bracket 25a and the rear bracket cover 26d, to extend outside from a lower surface thereof, thereby to shut off the path of the cooling water passages 14 and 15 under the condition when it is attached.

Also, the coupler member 16 is made up from a material, which can endure with pressure of the cooling water and the circumferential temperature of an engine room. In more details, since the circumferential temperature within the engine room and also the temperature of the alternator for use in a vehicle itself change greatly, such the material is preferable that makes the thermal expansion of the alternator for use in the vehicle small in the axial direction thereof. For example, such as, iron or aluminum is preferable, as used in the stator 12.

However, the coupler member 16 may be so configured that it is in a pipe-like shape at the inlet/outlet portion 16b while being connected with a flexible passage member (not shown in the figure), thereby to absorb the thermal expansion difference thereof. As this passage member may be used a pipe or the like, being same to that which is utilized in an engine radiator, for example.

The water supply/discharge attachment member 21, as apparent in the FIG. 12, is attached with a water discharge opening 22 and a water supply opening 23, and is also formed with a partition portion 21a projected for separating the water supply/discharge passages into.

Figure 17A:
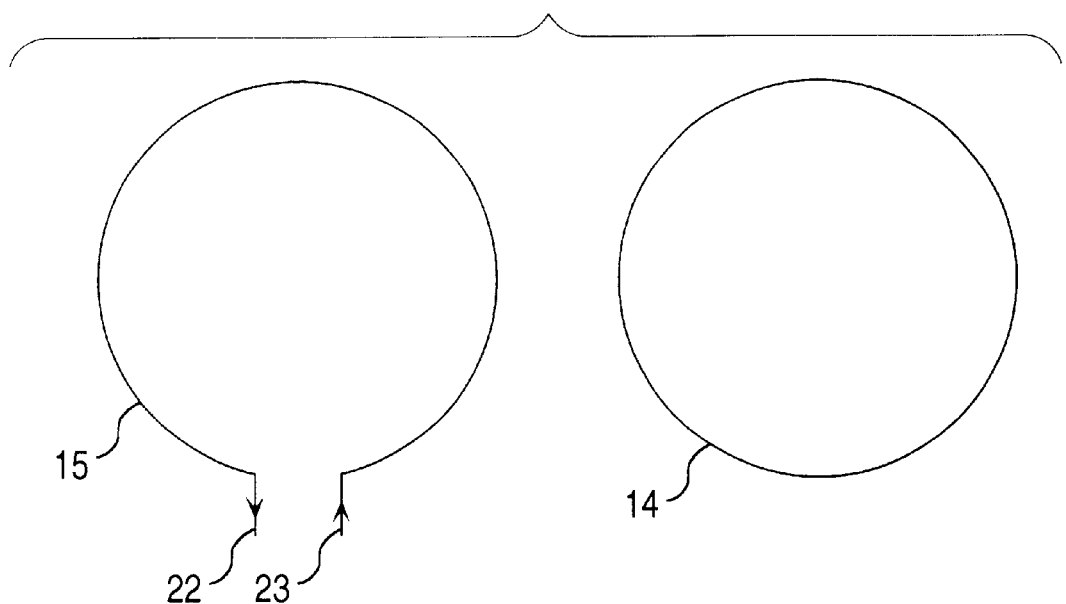
FIGS. 17(A) and 17(B) are views for use in explanation of a cooling water system in the same alternator for use in a vehicle, depending upon the presence of the conduction member.
Figure 17B:
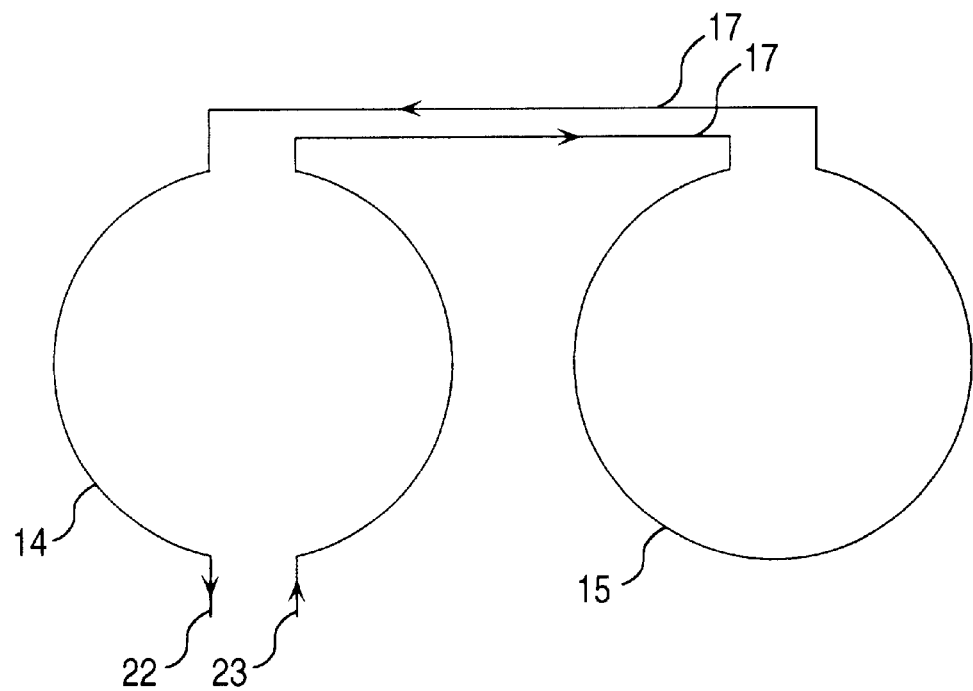

As was mentioned in the above, between the water supply opening 23 and the water discharge opening 22 of the cooling water, and the inlet/outlet openings of the coupler member 16, the water supply/discharge partitioning portions 21a and the cooling water partitioning portion 16a are provided. The water supply/discharge partitioning portions 21a and the cooling water partitioning portion 16a are formed with the water supply attachment member 21 and the coupler member 16 in one body, and they shut down the cooling water passages 14 and 15 when they are attached onto the bracket, thereby preventing the cooling water from running out from the supply opening 23 to the discharge opening 22, as well as, from running in short-circuited to the inlet/outlet opening of the coupler member 16, directly. With this, it is possible to connect the cooling water passages 14 and 15 of the front bracket body 25a and the rear bracket cover 26d, in series, though they are inherently independent from each other. The routes simplified on those cooling water passages 14 and 15 will be shown in FIGS. 17(A) and 17(B). FIG. 17(A) shows the cooling water passage 14 of the front bracket body 25a and the cooling water passage 15 of the rear bracket cover 26d before attached with the coupler members 16 thereon, and FIG. 17(B) that in the condition where the coupler members 16 are attached thereon. As is shown in the FIG. 17(B), under the condition that the coupler members 16 are attached, the total cooling water system is connected in series, thereby constituting one cooling water system. The water supply/discharge partitioning portion 21a and the cooling water portioning portion 16a need not to shut off the cooling water passages 14 and 15, completely, but the cooling water passages may be opened a little bit if they are brought into such the route as shown in the FIG. 17(A).

Preferably, an outer diameter of the alternator for use in a vehicle is as small as possible when thinking about the case where it is fixed onto the engine, and with such the structure that the coupler member 16 is attached partially, the outer diameter can be made small on the portion where no such the coupler member 16 is provided, thereby allowing the restriction upon the space for installation thereof to be less. Also, though it makes the alternator for use in the vehicle large in the maximum diameter thereof, thereby bringing workability in installation to be worse, however, according to the present invention, the locations where the water supply/discharge openings and the coupler members 16 should be attached can be selected as one from the plural numbers of the coupler member attachment portions 24, which are provided by plural numbers on the periphery of the front bracket 25 and the rear bracket 26, as shown in the FIGS. 12 and 13. Accordingly, the coupler members 16 can be located at the position where it brings about no interference with the engine and/or the other electric appliances. With this, without bringing about a substantial increase in the outer diameter for attachment of the alternator for use in the vehicle, it is possible to install the alternator for use in a water-cooling vehicle within the installing space, being equal to that for the conventional alternator for use in the air-cooling vehicle.

According to the present embodiment, since it is possible to use the cooling water for the engine, effectively, for the purpose of cooling down the stator 12 and the rotor 1 of the alternator for use in a vehicle, although the bracket sizes are almost equal to those of the alternator for use in the air-cooling vehicle, therefore it is possible to obtain a high power output from the alternator. Further, according to the present embodiment, since it is possible to obtain such the structure that the rotor 1 is closed at both sides thereof, therefore it is possible to obtain the weatherproof, thus maintaining the capacity even if it is completely submerged within water, while realizing stillness or silence which can not be obtained by such the alternator for use in the air-cooling vehicle.

According to the present invention, it is possible to obtain an alternator for use in an a vehicle, with which the stator and the rotor can be cooled down effectively, but with generating low noises, thereby obtaining a high power output.

Also, according to the present invention, it is possible to obtain an alternator for use in a vehicle, being superior in the mass production since it can be cope with the standardization for various kinds of vehicles, as well as, being able to cope with the restriction upon the space for installation thereof.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications falling within the ambit of the appended claims.

What is claimed is:

1. An alternator for use in a vehicle, comprising:
   a stator having a stator core being formed in a cylindrical shape and a stator coil wound around said stator core;
   a rotor having pole cores and an excitation coil, being attached on an axially extending rotation shaft, so as to be located within said stator;
   brackets, being thermally connected to said stator for supporting said stator, for supporting said rotation shaft at both sides of said rotor, and being closed at one side of said rotor;
   cooling liquid passages provided in said brackets;
   a cooling fan provided at the closing side of said rotor and
   a cooling fin provided in vicinity of said cooling liquid passages, said cooling fin being arranged so as to oppose said cooling fan in an axial direction of said rotor so as to enable generation of a circulating cooling air flow which flows from said cooling fan via said cooling fin to return to said cooling fan.

2. An alternator for use in a vehicle, as defined in the claim 1, wherein said cooling fan is of a centrifugal type, having plural numbers of blades extending in radial directions, so as to emit an air sucked from a central portion from an outer peripheral portion thereof, and said cooling fin has plural numbers of fin portions extending in radial directions, so as to form return passages for guiding the air emitted from said cooling fan from the outer peripheral portion to the central portion.

3. An alternator for use in a vehicle, as defined in the claim 2, wherein the fin portion of said cooling f in is inclined in a direction of an angle of flow out from said cooling fan in an outer peripheral portion thereof, while an inner peripheral portion being directed into a central direction thereof.

4. An alternator for use in a vehicle, as defined in the claim 2, further comprising a fin guide for partitioning between said cooling fin and said cooling fin, being thermally connected with said cooling fin.

5. An alternator for use in a vehicle, as defined in the claim 1, wherein said bracket is formed from aluminum die-cast, and with said bracket is formed said cooling fin in one body.

6. An alternator for use in a vehicle, as defined in the claim 1, wherein said cooling fan is made of material having good heat conductivity, and in thermally contact with end surface of the pole cores of said rotor over entire periphery thereof.

7. An alternator for use in a vehicle, as defined in the claim 1, wherein said at least one cooling fan and said cooling fin are arranged and configured so that the cooling air flow flows from a central portion of said at least one cooling fan radially outwardly from a periphery thereof and radially inwardly via said cooling fin to return to the central portion of said at least one cooling fan.

8. An alternator for use in a vehicle, comprising:
   a stator having a stator core being formed in a cylindrical shape and a stator coil wound around said stator core:
   a rotor having pole cores arid an excitation coil, being attached on an axially extending rotation shaft, so as to be located within said stator,
   brackets, being thermally connected to an outer periphery of said stator for supporting said stator, for supporting said rotation shaft at both sides of said rotor, and one of said brackets being closed at at least one side of said rotor;
   an electric appliance disposed with respect to a side surface portion of one of said brackets for supporting said stator;
   cooling liquid passages having an outer peripheral cooling liquid passage formed on an outer peripheral portion of at least the one of said brackets for supporting said stator, and a side surface cooling liquid passage formed on a side surface portion of the one of said brackets which doses the one side of said rotor;
   at least one cooling fan, said at least one cooling fan being provided at the closed side of said rotor; and
   a cooling fin provided in vicinity of said side surface cooling liquid passage, said cooling fin being arranged so as to oppose said cooling fan in an axial direction of said rotor so as to enable generation of a circulating cooling air flow which flows from, said cooling fan via said cooling fin to return to said cooling fan.

9. An alternator for use in a vehicle, as defined in the claim 8, wherein said cooling fan is of a centrifugal type, having plural numbers of blades extending in radial directions, so as to emit an air sucked from a central portion from an outer peripheral portion thereof, and said cooling tin has plural numbers of tin portions extending in radial directions, so as to form return passages for guiding the air emitted from said cooling fan from the outer peripheral portion to the central portion.

10. An alternator for use in a vehicle, as defined in the claim 8, wherein said brackets have side surface portions for closing down at both sides of said rotor, and said at least one cooling fan is provided at the both sides of said rotor, respectively.

11. An alternator for use in a vehicle, as defined in the claim 8, wherein another said bracket has a side surface portion for opening another side of said rotor, and said at least one cooling fan includes another cooling fan for passing air outside at the other side of said rotor.

12. An alternator for use in a vehicle, as defined in the claim 8, wherein said at least one cooling fan and said cooling fin are arranged and configured so that the cooling air flow flows from a central portion of said at least one cooling fan radially outwardly from a periphery thereof and radially inwardly via said cooling fin to return to the central portion of said at least one cooling fan.

* * * * *